(12) United States Patent
Rine

(10) Patent No.: US 7,147,896 B2
(45) Date of Patent: Dec. 12, 2006

(54) ELECTROLESS NICKEL PLATING METHOD FOR THE PREPARATION OF ZIRCONIA CERAMIC

(76) Inventor: Mark D. Rine, 5622 Vann Rd., Newburgh, Warrick County, IN (US)

( * ) Notice: Subject to any disclaimer, the term of this patent is extended or adjusted under 35 U.S.C. 154(b) by 219 days.

(21) Appl. No.: 10/836,068

(22) Filed: Apr. 30, 2004

(65) Prior Publication Data

US 2005/0241953 A1    Nov. 3, 2005

(51) Int. Cl.
  *B05D 3/10* (2006.01)
(52) U.S. Cl. .................. 427/305; 427/304; 427/301; 427/299
(58) Field of Classification Search ............. 427/305, 427/299, 301, 304
  See application file for complete search history.

(56) References Cited

U.S. PATENT DOCUMENTS 3,681,209 A * 8/1972 Campbell et al. ........... 205/109
3,926,570 A * 12/1975 Wilks et al. ................ 428/570
4,473,410 A * 9/1984 Grubb et al. ............... 148/276
5,149,420 A * 9/1992 Buxbaum et al. ........... 205/219

* cited by examiner

*Primary Examiner*—Timothy Meeks
*Assistant Examiner*—Howard Abramowitz
(74) *Attorney, Agent, or Firm*—Gary K. Price, Esq.

(57) ABSTRACT

An electroless nickel plating method for the preparation of zirconia ceramic material. The surface of the zirconia ceramic material is first cleaned of contaminants. This is followed by an etching step where the surface of the material is etched by an acid. Then, activating the surface of the material is achieved by first applying a tin sensitizer, and then a palladium activator. Following the palladium activator step, applying an electroless nickel to the surface of the post activated material. After the electroless nickel bath, the zirconial ceramic material can then be further electroless or electrolytically plated with a variety of finishes. Applying the method of the present invention provides a suitable, commercially practicable method for the preparation of zirconia ceramic material for electroless nickel plating, so that the electroless nickel chemistry is distributed evenly on the material's surface.

5 Claims, No Drawings

ELECTROLESS NICKEL PLATING METHOD FOR THE PREPARATION OF ZIRCONIA CERAMIC

CROSS REFERENCES TO RELATED APPLICATIONS

None.

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates generally to a process for preparing zirconia ceramic and similar ceramic materials. More particularly, it relates to a process used to metallize the surface of zirconia ceramic and similar ceramic materials, so that the electroless nickel chemistry is distributed evenly on the material's surface.

2. Brief Description of Prior Art

Zirconia ceramic is a high technology ceramic that has high strength and hardness and has excellent surface smoothness that make this material desirable in applications such as pump parts, hip replacement joints, golf cleats, buttons, knife and scissor blades, metal extrusion dies, electronic components such as duplexer filters, and in other applications where similar conditions exist. In addition, it is often desirable with some applications to have the surface of the zirconia ceramic metallized to provide enhanced electrical or mechanical requirements. The very qualities that make zirconia ceramic material desirable for use in these applications as described also makes it a difficult material to metallize with plating technology.

Traditional electroless plating technology includes an "etch" process, where highly active acids such as hydrofluoric acid is used to etch the surface of the material so that the material will retain the "surface activation" in subsequent steps. Activating the surface of the material requires seeding the surface of the material with metal ions that will then exchange with the electroless nickel chemistry (in subsequent steps) as part of an autocatalytic process that distributes nickel evenly on the material's surface.

Activation may be accomplished with such known processes as "tin sensitizer" followed by a rinse, followed by a "palladium activator" followed by a rinse.

In known plating processes, each chemistry step is traditionally followed by a rinse step to avoid mixing of chemistry that can cause contamination of the subject chemicals. Such contamination may likely result in the chemistry not functioning to expected specification. Non-zirconia ceramic is much more porous and not as hard as zirconia ceramic. Such porous surface of non-zirconia ceramics allows the palladium activator or other activation chemistry to be retained on the surface after rinsing. That is not the case with zirconia ceramics.

Traditional plating techniques known in the art will not work on zirconia ceramic. As described, zirconia ceramic is a high technology ceramic that has high strength and hardness and has excellent surface smoothness. As a result, acid etch chemistries known in the art do not penetrate the surface of the zirconia ceramic material due to its hardness, and the subsequent activation chemistry has weak adhesion to the material's surface due to the smoothness of the surface. Upon rinsing following activating the surface as described above, the activation chemistry is removed from the surface of the material and subsequent electroless nickel plating is inconsistent.

To the best knowledge of the applicant, a suitable, commercially practicable method has not been found for the preparation of zirconia ceramic material for electroless nickel plating, so that the electroless nickel chemistry is distributed evenly on the material's surface.

As will be seen from the subsequent description, the preferred embodiments of the present invention overcome shortcomings of the prior art.

SUMMARY OF THE INVENTION

Briefly stated, the present invention is directed to an electroless nickel plating method for the preparation of zirconia ceramic material. The method omits the rinsing step between the surface activation step and the step of distributing electroless nickel chemistry on the material's surface. The surface tension of the activation chemistry, such as palladium activators, allows the activation to be retained by the surface of the ceramic so that the material will subsequently plate in the electroless nickel bath.

In the method of the present invention, the surface of the zirconia ceramic material is cleaned substantially free of contaminants. This is followed by an acid etching step where the surface of the material is etched, and then rinsed. Then, activating the surface of the material is achieved by first applying a tin sensitizer, rinsing, and then a palladium activation. Following the palladium activation, applying an electroless nickel to the surface of the material, and rinsing. After application of the electroless nickel, the zirconial ceramic material can then be subsequently plated with other electroless materials, including, but not limited to, gold, nickel, tin, copper or can electrolytically be plated with materials, including, but not limited to, silver, copper, tin, gold, tin copper, copper tin zinc and brass.

Applying the method of the present invention provides a suitable, commercially practicable method for the preparation of zirconia ceramic material for electroless nickel plating, so that the electroless nickel chemistry is distributed evenly on the material's surface.

BRIEF DESCRIPTION OF THE DRAWINGS

The present invention will be illustrated on the basis of the following description of the preferred embodiments thereof.

DESCRIPTION OF THE PREFERRED EMBODIMENT

In accordance with the present invention, an electroless nickel plating method for the preparation of zirconia ceramic is disclosed. More particularly, the disclosed method relates to a process used to metallize the surface of zirconia ceramic material so that the electroless nickel chemistry is distributed evenly on the material's surface. The process for metallizing the substrate surface resulting in excellent surface coverage and bond strength.

Specifically, it will be noted in the following description that the present disclosure relates to a method used to metallize the surface of zirconia ceramic material in order to provide enhanced electrical or mechanical requirements. In the broadest context, the process consists of components and steps configured with respect to each other so as to attain the desired objective.

In general, the zirconia ceramic (hereinafter referred to as "ceramic") is formed by conventional manufacturing techniques. The electroless nickel plating method for the preparation of the ceramic generally includes the steps of cleaning the surface of the ceramic material so that it the surface is substantially free of contaminants; etching the surface of the material, and then rinsing; then, activating the surface of the material by first applying a tin sensitizer, rinsing, and then a palladium activator; and, applying an electroless nickel to the surface of the material, and rinsing. After application of the electroless nickel, the zirconial ceramic material can then be further electroless or electrolytically plated with a variety of finishes.

More particularly, the electroless plating method of the present invention for preparing the ceramic body is as follows:

1. Cleaning Step. The surface of the ceramic material is thoroughly cleaned. The purpose of the cleaning step is to remove all fingerprints, stains, oil, dust, etc. from the surface. A preferred method of cleaning is caustic soaking for approximately 5 minutes. Alternatively, the cleaning step could be completed with other like cleaning solutions known in the art.

The ceramic material is then thoroughly rinsed.

2. Acid Etch Step. The ceramic material is immersed in a solution for an etching effect. The purpose of the etching step is to etch the surface of the ceramic so that the surface will retain the surface activation in following steps. In the preferred embodiment, the acid etching solution is nitric acid with ammonium biflouride (1 lb/gallon). The ceramic material is immersed in the acid etch solution for approximately 2 minutes. Alternatively, the etch step could be completed with other like solutions known in the art.

The ceramic material is then thoroughly rinsed in water.

3. Activation Step. This step generally involves treating the ceramic surface to activate it for electroless metal deposition. More particularly, activation involves seeding the surface of the ceramic with metal ions that will then exchange with the electroless nickel in following steps. The activation process includes tin sensitizer followed by a palladium activator.

Tin Sensitizer. The ceramic material is treated with a tin sensitizing solution for approximately 2 minutes.

This is representative of commercial tin sensitizer solutions in general use. MACUPLEX 78 sold commercially by MacDermid Incorporated is one example of this type of solution. The tin sensitizer treatment may be completed with other like products known in the art.

The ceramic material is then thoroughly rinsed in water.

Palladium Activator. The ceramic material is treated with a palladium activation solution. The palladium activator allows the activation to be retained upon the surface of the ceramic so that the ceramic will subsequently plate in the electroless nickel bath. The ceramic material is treated with the palladium activation solution for approximately 2 minutes.

This is representative of commercial palladium activation solutions in general use. "Niklad 262" sold commercially by MacDermid Incorporated is one example of this type solution. The palladium activation treatment may be completed with other like solutions known in the art.

The palladium activation is retained to the surface of the ceramic component to be plated via surface tension thus facilitating ion exchange with the subsequent electroless nickel chemisty.

4. Electroless Nickel Plating Step. The resulting pretreated ceramic material can then be plated with many various electroless and electrolytic plating finishes.

This is representative of commercial electroless nickel solutions in general use. "Accurate 385 N" sold commercially by Sirius, Inc. is one example of this type solution.

The ceramic material is then thoroughly rinsed in water.

It is critical to note that the ceramic material is not rinsed following the treatment of the palladium activation solution of the activation step and the electroless nickel plating step. This is distinguishable over prior art methods. As a result, the activation chemistry is maintained on the smooth surface of the ceramic material. The metal plating can then be distributed more evenly and consistent during the subsequent metal plating step.

5. Post Treating of the Ceramic. The resulting ceramic material is desirably post treated with an electrolytic silver plating solution.

The resulting ceramic material can be post treated with a variety of finishes that include, but are not limited to, electrolytic silver, gold, nickel, tin, solder, copper, and various alloys and electroless or immersion nickel, gold, tin and silver.

The ceramic material is then thoroughly rinsed in water.

The method of the present invention is particularly useful to metallize the surface of zirconia ceramic material so that the electroless nickel chemistry is distributed evenly on the material's surface. The method disclosed allows the activation to be retained upon the surface of the ceramic so that the ceramic material will subsequently plate in the electroless nickel bath.

Any metal film may be deposited on the surface of a ceramic substrate in accordance with the present invention. Typically, copper; nickel, silver, gold tin or cobalt films or deposits are electrolessly deposited.

The resulting zirconia ceramic material have numerous applications such as pump parts, hip replacement joints, golf cleats, buttons, knife and scissor blades, metal extrusion dies, electronic components such as duplexer filters, and in other applications where similar conditions exist.

Although the description above contains many specificities, these should not be construed as limiting the scope of the invention but as merely providing illustrations of some of the presently preferred embodiments of this invention. For example, while the present invention is directed to an electroless nickel plating method for the preparation of zirconia ceramic, any metal film may be deposited to the surface of a zirconia ceramic substrate in accordance with the present invention.

Thus the scope of the invention should be determined by the appended claims in the formal application and their legal equivalents, rather than by the examples given.

I claim:

1. An electroless nickel plating method for the preparation of zirconia ceramic comprising the following steps in the order named:

cleaning the surface of the ceramic material of contaminants,
  rinsing the ceramic material,
  etching the surface of the ceramic material,
  rinsing the ceramic material,
  treating the ceramic with a tin sensitizer solution,
  rinsing the ceramic material,
  treating the ceramic material with a palladium activation solution, and without rinsing,
  immersing the ceramic material in an electroless nickel solution, rinsing the ceramic material,
treating the ceramic material with an electrolytic silver solution, and
rinsing the ceramic material.

2. The method as recited in claim 1, wherein the cleaning comprising a caustic soaking.

3. The method as recited in claim 1, wherein the acid etching solution comprises at least in part nitric acid with ammonium biflouride.

4. An electroless nickel plating method for the preparation of zirconia ceramic comprising the following steps in the order named:
    cleaning the surface of the ceramic material of contaminants,
    rinsing the ceramic material,
    etching the surface of the ceramic material,
    rinsing the ceramic material,
    treating the ceramic with a tin sensitizer solution,
    rinsing the ceramic material,
    treating the ceramic material with a palladium activation solution, and with the palladium activation solution still on the surface of the ceramic material, and without rinsing,
    immersing the ceramic material in an electroless nickel solution,
    rinsing the ceramic material,
    treating the ceramic material with an electrolytic silver solution, and
    rinsing the ceramic material.

5. An electroless nickel plating method for the preparation of zirconia ceramic comprising the following steps in the order named:
    cleaning the surface of the ceramic material of contaminants,
    rinsing the ceramic material,
    etching the surface of the ceramic material,
    rinsing the ceramic material,
    treating the ceramic with a tin sensitizer solution,
    rinsing the ceramic material,
    treating the ceramic material with a palladium activation solution, and with a portion of the palladium activation solution maintained on the ceramic material by surface tension, and without rinsing,
    immersing the ceramic material in an electroless nickel solution,
    rinsing the ceramic material,
    treating the ceramic material with an electrolytic silver solution, and
    rinsing the ceramic material.

* * * * *